Oct. 19, 1954     O. E. RUGG     2,691,854
GLASS BENDING PROCESS
Filed June 16, 1952     2 Sheets-Sheet 2

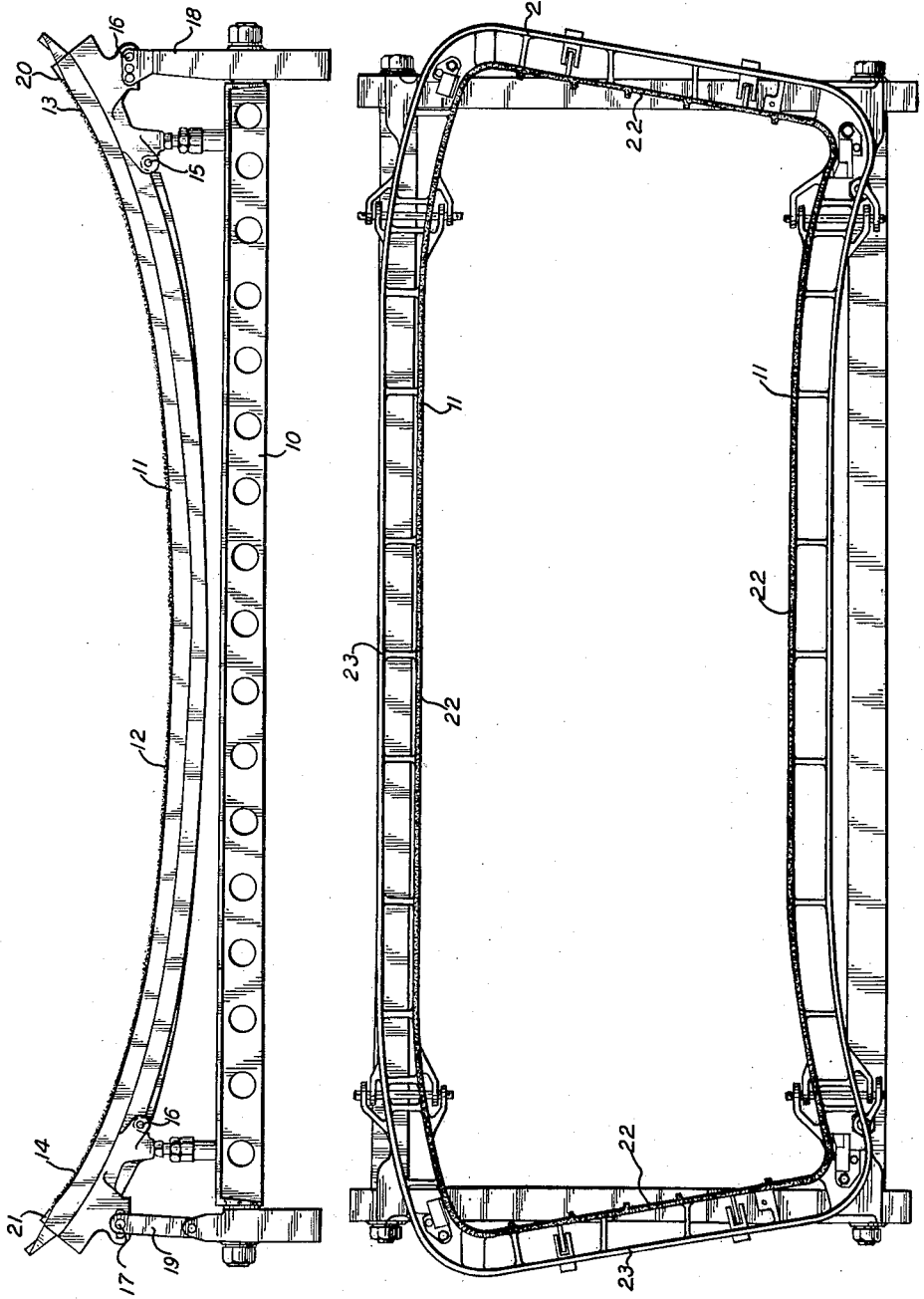

O. E. RUGG
INVENTOR.

BY

ATTORNEYS

Patented Oct. 19, 1954

2,691,854

UNITED STATES PATENT OFFICE 2,691,854

GLASS BENDING PROCESS

Ormund E. Rugg, Detroit, Mich., assignor to Ford Motor Company, Dearborn, Mich., a corporation of Delaware Application June 16, 1952, Serial No. 293,773

2 Claims. (Cl. 49—84)

This invention resides in the glass field and more particularly in that segment of glass technology which is concerned with the production of bent glass products from ordinary planar sheet or plate glass. This field of endeavor has assumed increased commercial importance in recent years due to the demand for curved windshields for automotive vehicles. The art of bending sheet or plate glass to almost any desired configuration is very old and where single sheets are concerned and no rigid dimensional tolerances are required many satisfactory techniques are known.

The fact that the curved windshield for use in motor vehicles must be laminated and further that the finished product must be held to close dimensional and optical tolerances makes ordinary glass bending techniques obsolete and at best commercially impractical. It is necessary that any process to be commercially practical must be capable of repetitiously producing the maximum number of sheets of glass in a minimum of time with unskilled or semi-skilled labor and with a minimum of breakage. The instant invention was perfected to further the obtention of this goal.

The prime object of this invention has been to reduce the breakage occurring during the bending process as the glass passes through a temperature range in which it is particularly brittle and while at the same time under severe stress.

It is a further object of this invention to produce finished windshields in which the glass is in a less strained condition and hence less liable to breakage in subsequent mechanical handling operations.

The substance of this invention is best understood by a consideration of the drawings of this application in which:

Figure 1 is an elevation view of a mold employed for the production of bent glass windshields.

Figure 2 is a plan view of this same glass bending mold and

Figure 3:
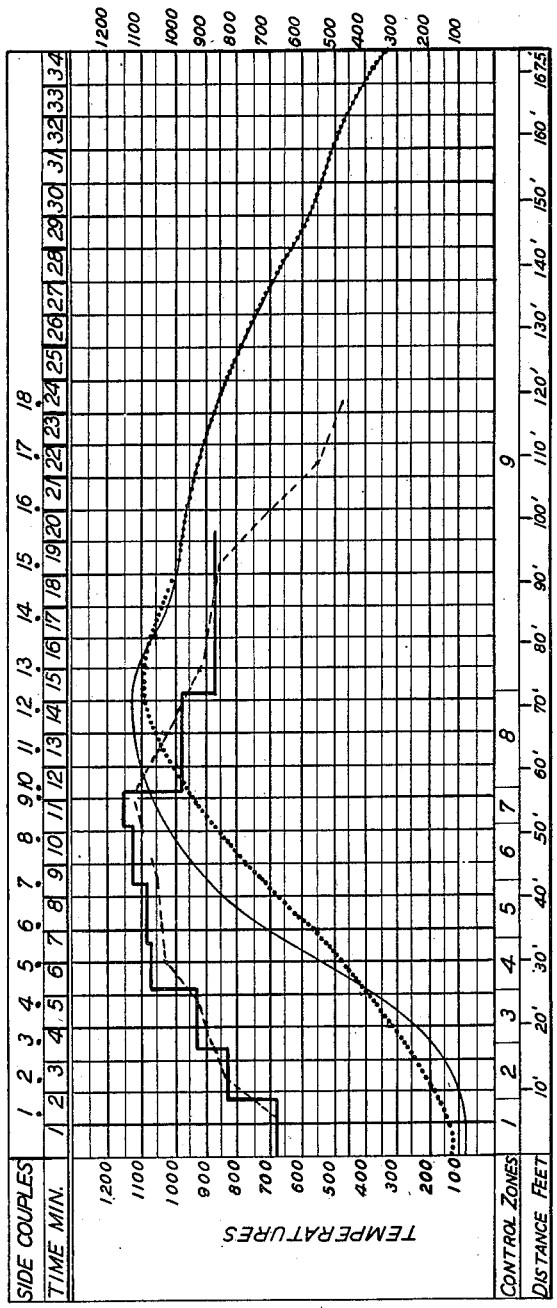
Figure 3 is a graphical representation of the time and temperature conditions obtained in a typical large glass bending lehr.

In Figure 1 a typical so-called hinge mold for the bending of glass is shown in elevation. This mold is shown in the closed position or otherwise stated in the position assumed when the glass has been bent to the desired shape. Basically this mold compises a frame 10 upon which is mounted a tripartite bending surface 11. The bending surface 11 is divided into a center section 12 and two end sections 13 and 14. Center section 12 is supported on pivots 15 and 16 while the end sections 13 and 14 are supported by pivots 16 and 17 respectively, which in turn are supported by bars 18 and 19. End sections 13 and 14 are provided with stops 20 and 21 which limit the motion of the glass being bent in a sideward direction.

Figure 2 is similar to Figure 1 except it is a plan view. In this plan view the glass supporting mechanism, per se, can be seen to consist of a narrow rail 22 around the periphery of the structure. There are, of course, joints in this rail where center section 12 joints and sections 13 and 14. Rail 23 surrounding rail 22 is simply employed to give an adequate rigidity to the structure and does not come in contact with the glass.

In the operation of this type of mold, two precut pieces of plate or sheet glass are laid one upon the other and the assembly is gently lowered upon the bending fixture which in the plan view has an outline roughly similar to that of the glass to be bent. Rail 22 is usually built to enclose an area slightly smaller than the actual sheet of glass. Before the glass sheets are lowered into the bending fixture the center section 12 is raised and hence stops 20 and 21 open sufficiently to receive the glass. The weight of center section 12 in particular acts to apply a force to the glass parallel to its long axis and which force is applied through stops 20 and 21. The assembly of the bending fixture and the two sheets of glass is now slowly passed through a glass bending lehr in which the temperature is slowly raised from room temperature to about 1140° F. and then cooled to about 300° F. before emerging from the other end of the lehr. The weight of the glass aided by the forces applied by stops 20 and 21 causes the glass to slowly sink as it becomes plastic due to the increase in temperature. This sinking action is arrested when the glass is supported all along rail 22. Thus it will be seen that the final contour of the glass is governed by the contour of rail 22 when in the closed position depicted in Figure 1.

As described above and as originally practiced, this process was causing a high percentage of glass breakage within the lehr. This breakage persisted in sacrificing in excess of one out of each four work pieces despite the most careful and rigorous control of the temperature gradients throughout the lehr. Since it is known that glass becomes inordinately brittle at a temperature somewhat lower than the bending temperature, it was thought that the unequal heating of the mold and the glass itself might account for some of this breakage. Accordingly, thermocouples were secured to the glass and to the mold and temperature measurements taken during the entire bending cycle. The results of this experimentation were very illuminating and have been graphically illustrated in Figure 3. In this figure the time element or distance in feet along the lehr has been employed as an abscissa and temperature as an ordinate. The temperature of the glass is indicated by the curved solid line starting just below the 100° mark and extending the width of the glass. The temperature of the fixture is represented by the heavy dotted line starting just above 100° and continuing across the entire width of the graph. For information, the recordings of the side couples and top couples secured permanently to the lehr have also been shown. The side couples are indicated by the upper dashed line and the top couples by the upper solid stepped line. From a study of this graph and particularly the large temperature differential shown between the glass and the bending fixture, it was decided that this factor might be responsible for a large percentage of the glass failures.

As an expedient for reducing this temperature differential, rail 22 was painted over its entire upper surface with conventional stove polish. This stove polish comprises carbon black and graphite suspended in a hydro-carbon vehicle and having a small amount of resin added to improve its adherence to the metal surface. It is thought that the primary function of the stove polish is to provide a surface on the rail 22 which behaves more like a theoretical black body and hence absorbs more heat from its ambient. This thin layer of carbon is also thought to act as an actual thermal barrier to the conductive transfer of heat from the rail 22 to the ambient and to serve as a high temperature lubricant to facilitate the movement of the glass with respect to rail 22. The lubricity of graphite at high temperature is, of course, well known in the art. Since the atmosphere within the lehr is well above the ignition point of carbon and is decidedly oxidizing, the bulk of the coat of stove polish is destroyed during each passage through the lehr and must be renewed prior to the next bending operation. However, this coating has been found sufficiently durable for the purpose and its use resulted in an immediate drop in lehr breakage of about 50 per cent.

It has been found by experience that it is not absolutely essential that the entire periphery of rail 22 be coated but it is usually sufficient if the two end sections 13 and 14 be coated. However, slightly less breakage is obtained if the entire rail is coated.

I claim as my invention:

1. In a process of bending sheet or plate glass to a predetermined configuration, the steps of providing a mold capable of supporting the sheet or plate around substantially its entire periphery when the glass has assumed said predetermined configuration, applying to the glass supporting surface of said mold a suspension of finely divided carbon black suspended in a volatile vehicle, applying a cold glass sheet or plate to the mold and supplying radiant heat to the combination of mold and glass to remove the volatile vehicle and leave a heat absorbing surface coating of carbon on the mold surface whereby the temperature of the glass and mold are equalized during the heating process and glass breakage is minimized.

2. In a continuous glass bending process in which sheet or plate glass is bent by passing through a lehr while supported upon a curved metal bending mold, the step of reducing breakage by reducing the temperature differential between the glass and the metal mold during heating, comprising coating the cool working surface of the mold with a suspension of finely divided carbon in a volatile vehicle, supporting a cold sheet of glass upon the mold and subjecting the combination of glass and mold to radiant heat to elevate the glass to a softening temperature.

References Cited in the file of this patent

UNITED STATES PATENTS

| Number | Name | Date |
|---|---|---|
| 207,321 | Wainwright | Aug. 20, 1878 |
| 2,236,119 | Craig et al. | Mar. 25, 1941 |
| 2,377,849 | Binkert et al. | June 12, 1945 |
| 2,518,951 | Smith | Aug. 15, 1950 |
| 2,549,535 | Skooglund | Apr. 17, 1951 |